(12) United States Patent
Martin et al.

(10) Patent No.: US 8,825,782 B2
(45) Date of Patent: *Sep. 2, 2014

(54) SYSTEM AND METHOD FOR VISUAL REPRESENTATION OF SPAM PROBABILITY

(75) Inventors: Daryl Martin, Paradise (CA); John F. Wilson, Waterloo (CA); Christopher D. O'Keefe, Waterloo (CA)

(73) Assignee: BlackBerry Limited, Waterloo (CA)

( * ) Notice: Subject to any disclaimer, the term of this patent is extended or adjusted under 35 U.S.C. 154(b) by 251 days.

This patent is subject to a terminal disclaimer.

(21) Appl. No.: 13/542,906

(22) Filed: Jul. 6, 2012

(65) Prior Publication Data

US 2012/0284350 A1    Nov. 8, 2012

Related U.S. Application Data

(63) Continuation of application No. 12/790,051, filed on May 28, 2010, now Pat. No. 8,244,818.

(51) Int. Cl.
*G06F 15/16* (2006.01)
*H04L 12/58* (2006.01)
*G06Q 10/10* (2012.01)
*G06F 12/00* (2006.01)

(52) U.S. Cl.
CPC .............. *G06Q 10/10* (2013.01); *H04L 12/585* (2013.01); *H04L 12/5895* (2013.01); *H04L 51/12* (2013.01)
USPC .......................................... 709/206; 709/207

(58) Field of Classification Search
USPC .......... 709/206–207, 217–219, 225–229, 250
See application file for complete search history.

(56) References Cited

U.S. PATENT DOCUMENTS

| | | |
|---|---|---|
| 6,161,130 A | 12/2000 | Horvitz et al. |
| 7,680,890 B1 | 3/2010 | Lin |
| 7,756,535 B1 | 7/2010 | Diao et al. |
| 8,023,974 B1 | 9/2011 | Diao et al. |
| 8,027,695 B2 | 9/2011 | Zabawskyj et al. |
| 8,095,602 B1 | 1/2012 | Orbach |
| 8,244,818 B2 * | 8/2012 | Martin et al. ............ 709/206 |

(Continued)

FOREIGN PATENT DOCUMENTS

WO    2006014314 A    2/2006

OTHER PUBLICATIONS

"Spam", Microsoft Computer Dictionary, 5th Ed, 2002, p. 492.

(Continued)

*Primary Examiner* — Zarni Maung
(74) *Attorney, Agent, or Firm* — Jenna L. Wilson; Dimock Stratton LLP

(57) ABSTRACT

There is disclosed a system and method for visually representing the probability of spam messages on a mobile communication device. In an embodiment, the method comprises: obtaining a probability that a message is spam; and for each of one or more messages in a message list, visually representing the probability that a message is spam such that any differences in the probabilities as between messages are discernable from the visual representation. In another embodiment, the method further comprises: determining the percentage of the message downloaded to the mobile communication device; and displaying for each of one or more messages appearing in the message list an object or icon visually representing at least one of the probability that the message is spam, or the percentage of the message downloaded to the mobile communication device.

20 Claims, 8 Drawing Sheets

(56) References Cited

U.S. PATENT DOCUMENTS

| | | |
|---|---|---|
| 2003/0096605 A1* | 5/2003 | Schlieben et al. ............ 455/419 |
| 2003/0109271 A1* | 6/2003 | Lewis et al. .................. 455/517 |
| 2003/0200267 A1 | 10/2003 | Garrigues |
| 2004/0003283 A1* | 1/2004 | Goodman et al. ............ 713/201 |
| 2005/0021649 A1* | 1/2005 | Goodman et al. ............ 709/207 |
| 2005/0097174 A1 | 5/2005 | Daniell |
| 2005/0204006 A1 | 9/2005 | Purcell et al. |
| 2006/0256012 A1 | 11/2006 | Fok et al. |
| 2006/0277257 A1 | 12/2006 | Kromann et al. |
| 2007/0079379 A1 | 4/2007 | Sprosts et al. |
| 2007/0124390 A1 | 5/2007 | Sivakumar et al. |
| 2007/0192490 A1 | 8/2007 | Minhas |
| 2010/0157853 A1 | 6/2010 | Li et al. |
| 2010/0263045 A1 | 10/2010 | Dulitz et al. |

OTHER PUBLICATIONS

Examination Report dated Aug. 30, 2013 from CA 2,740,356, pp. 1-2.

* cited by examiner

|     |        |       |              |                           |
|-----|--------|-------|--------------|---------------------------|
|     |        |       | Mon, May 31  |                           |
|     |        |       | 12:33 pm     |                           |
|     |        |       | --- Mon, May 31 --- |                    |
| 460 → | D%/S% |       |              |                           |
| 461 → | 100/10 | 12:28p | Robert      | Re: Meeting on Monday     |
| 462 → | 10/75  | 9:30a  | orders@xyz.co | Your Order Confirmation 00123 |
| 463 → | 10/90  | 8:13a  | Joe Bank Co | Please confirm your bank account |
|     |        |       | --- Fri, May 28 --- |                    |
| 464 → | 100/50 | 4:32p  | Robert      | Re: Meeting on Monday     |
| 465 → | 50/10  | 3:30a  | Brenda      | Thanks!                   |
| 466 → | 75/10  | 11:13a | Fred        | Re: Meeting on Monday     |

FIG. 4G — 400G

|     |        |       |              |                           |
|-----|--------|-------|--------------|---------------------------|
|     |        |       | Mon, May 31  |                           |
|     |        |       | 12:33 pm     |                           |
|     |        |       | --- Mon, May 31 --- |                    |
| 460 → | D%/S% |       |              |                           |
| 462 → | 10/75  | 9:30a  | orders@xyz.co | Your Order Confirmation 00123 |
| 463 → | 10/90  | 8:13a  | Joe Bank Co | Please confirm your bank account |

FIG. 4H — 400H

SYSTEM AND METHOD FOR VISUAL REPRESENTATION OF SPAM PROBABILITY

REFERENCE TO PRIOR APPLICATIONS

This application is a continuation of U.S. application Ser. No. 12/790,051, filed May 28, 2010, the entirety of which is incorporated herein by reference.

FIELD OF THE INVENTION

The present disclosure relates generally to systems and methods for managing spam.

BACKGROUND

Spam continues to be a great inconvenience for many email users, as these unwanted messages may slip by even the most intelligent spam filters which attempt to maintain an appropriate balance between letting too much spam through, and preventing legitimate messages from getting through. For email users using wireless email devices, the problem may be exacerbated by the fact that they may be charged for receiving the unwanted messages once their bandwidth usage exceeds their monthly data plan with their carrier. What is needed is an improved system and method for dealing with suspected spam messages.

BRIEF DESCRIPTION OF THE DRAWINGS

In the Figures which illustrate exemplary embodiments:

FIGS. 4A to 4H show various illustrative message list user interface screens in accordance with various embodiments.

DETAILED DESCRIPTION

As noted above, the present disclosure relates generally to a system and method for managing spam.

Figure 1:
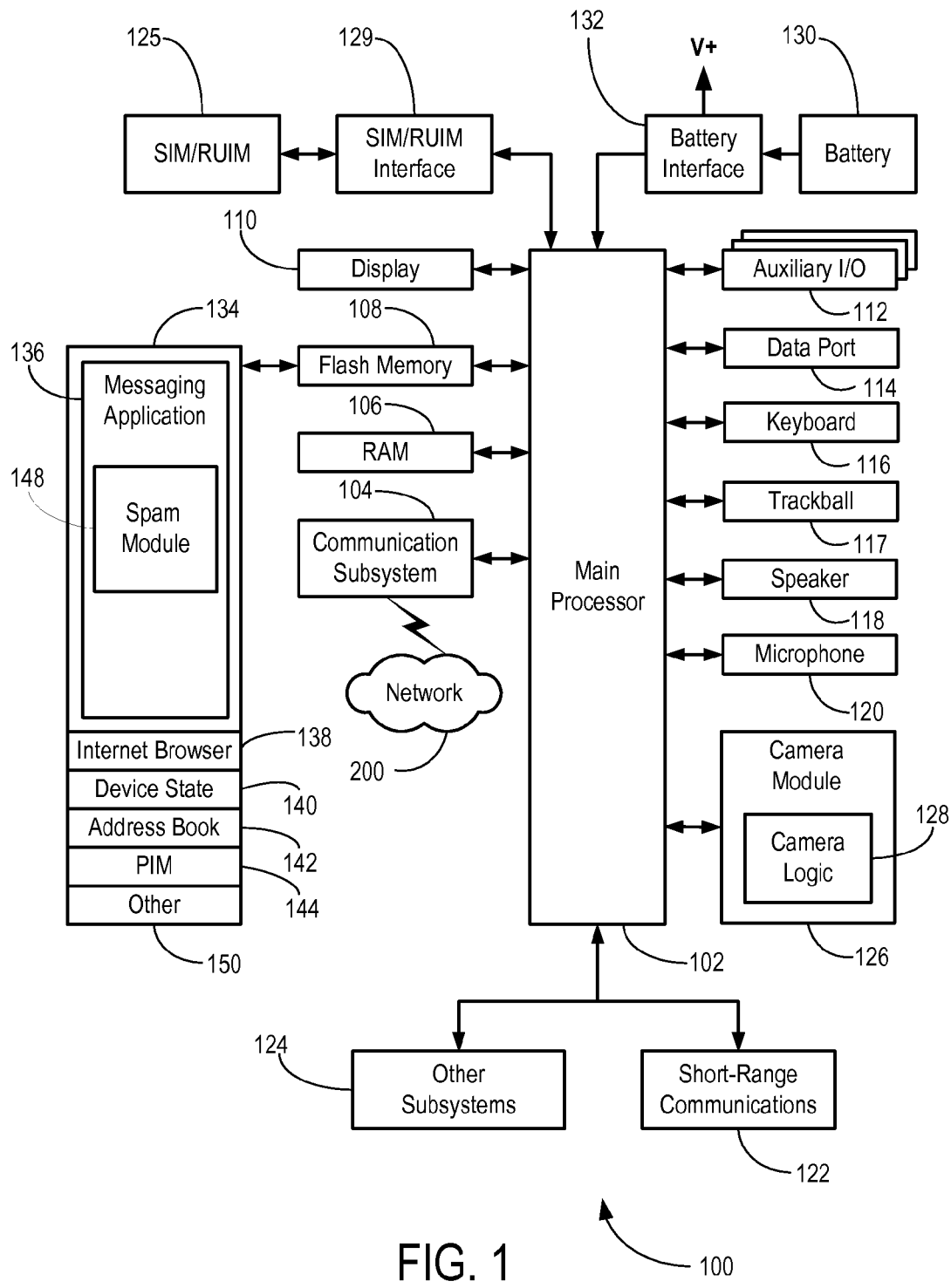
FIG. 1 is a schematic block diagram of various components that may be found in a handheld mobile communication device.

In an illustrative embodiment, the invention may be practiced with a handheld mobile communication device in a wireless operating environment. Shown in FIG. 1 is a schematic block diagram of an illustrative handheld mobile communication device 100. The communication device 100 may comprise a number of components, including a main processor 102 which controls the overall operation of communication device 100. Communication functions, including data and voice communications, may be performed through a communication subsystem 104. The communication subsystem 104 may receive messages from and send messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122, a GPS subsystem 124, a camera module 126, and associated camera logic 128.

Some of the subsystems of the communication device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing a user to depress the trackball, to allow selection of a highlighted item. Display 110 may also be a touch screen, allowing selection of displayed objects or menu items by touch.

Still referring to FIG. 1, operating system software used by the main processor 102 is typically stored in a persistent store such as flash memory 108. Those skilled in the art will appreciate that the operating system, specific device applications, or parts thereof, may be temporarily loaded into a volatile store, such as the RAM 106, for processing by main processor 102.

The communication device 100 may send and receive communication signals over the wireless network 200 after required network registration or activation procedures have been completed. Network access may be associated with a subscriber or user of the communication device 100.

To identify a user, the communications device 100 may use a SIM/RUIM/USIM card 125 (i.e. Subscriber Identity Module or a Removable User Identity Module or a Universal Subscriber Identity Module, etc.), which is inserted into a SIM/RUIM/USIM interface 129, to communicate with a network. The SIM/RUIM/USIM card 125 is one type of a conventional "smart card" that can be used to identify a user of the communications device 100 and to personalize the communications device 100, among other things.

The communication device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communication device 100. The battery 130 may be used to power all components and modules in the communication device 100.

The main processor 102, in addition to its operating system functions, enables execution of various software applications 134 on the communication device 100. A subset of software applications 134 that control basic device operations, including data and voice communication applications, will normally be installed on the communication device 100 during its manufacture.

The software applications 134 may include a messaging application 136. The messaging application 136 can be any suitable software program that allows a subscriber or user of the communication device 100 to send and receive wireless text communications. Messages that have been sent or received by the user are typically stored in local storage such as flash memory 108 of the communication device 100, or in some other suitable storage element in the communication device 100. In an alternative embodiment, some of the sent and received messages may be stored remotely from the communication device 100 such as in a data store of an associated host system that the communication device 100 communicates with.

In an embodiment, the messaging application 136 may include a spam module 148 for managing spam messages directed to the communication device 100. This spam module 148 will be described in more detail further below.

The communication device 100 may further include a browser 138, a device state module 140, an address book 142, a personal information manager (PIM) 144, and various other modules 150. Additional software applications may also be loaded onto the communication device 100 through at least one of the wireless network 200, the auxiliary I/O subsystem 112, the data port 114, the short-range communications subsystem 122, or other device subsystem 124.

Figure 2:
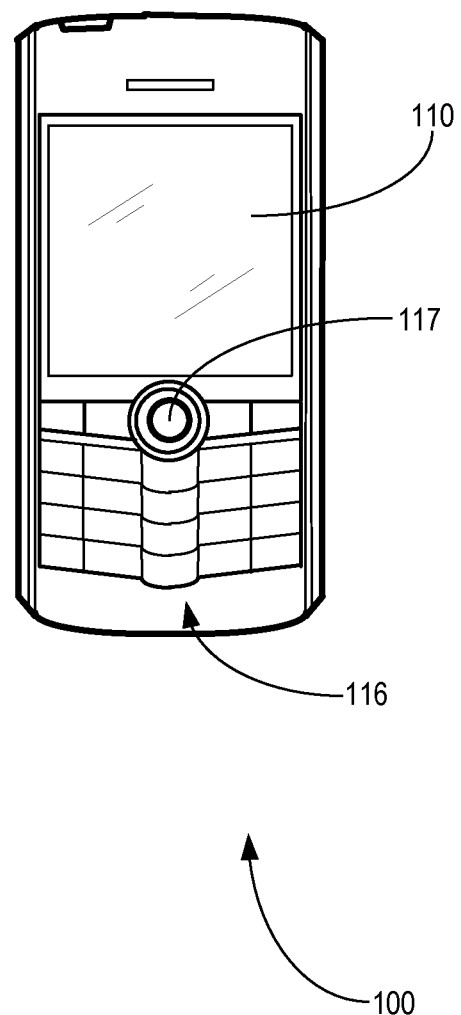
FIG. 2 is an illustrative example of a handheld mobile communication device which may provide an operating environment.

Now referring to FIG. 2, shown is an illustrative front view of a handheld mobile communication device 100 that may provide a suitable operating environment. As shown, the communication device 100 may include a display 110, a keyboard 116, and other input or navigation means such as a trackball 117. The display 110 may be configured to display various screens allowing the user of device 100 to view screen outputs from the various software applications 134, including the presentation module 149. In an embodiment, display 110 may be configured to provide a touch-sensitive screen input in response to a prompt or query displayed on display 110.

Figure 3:
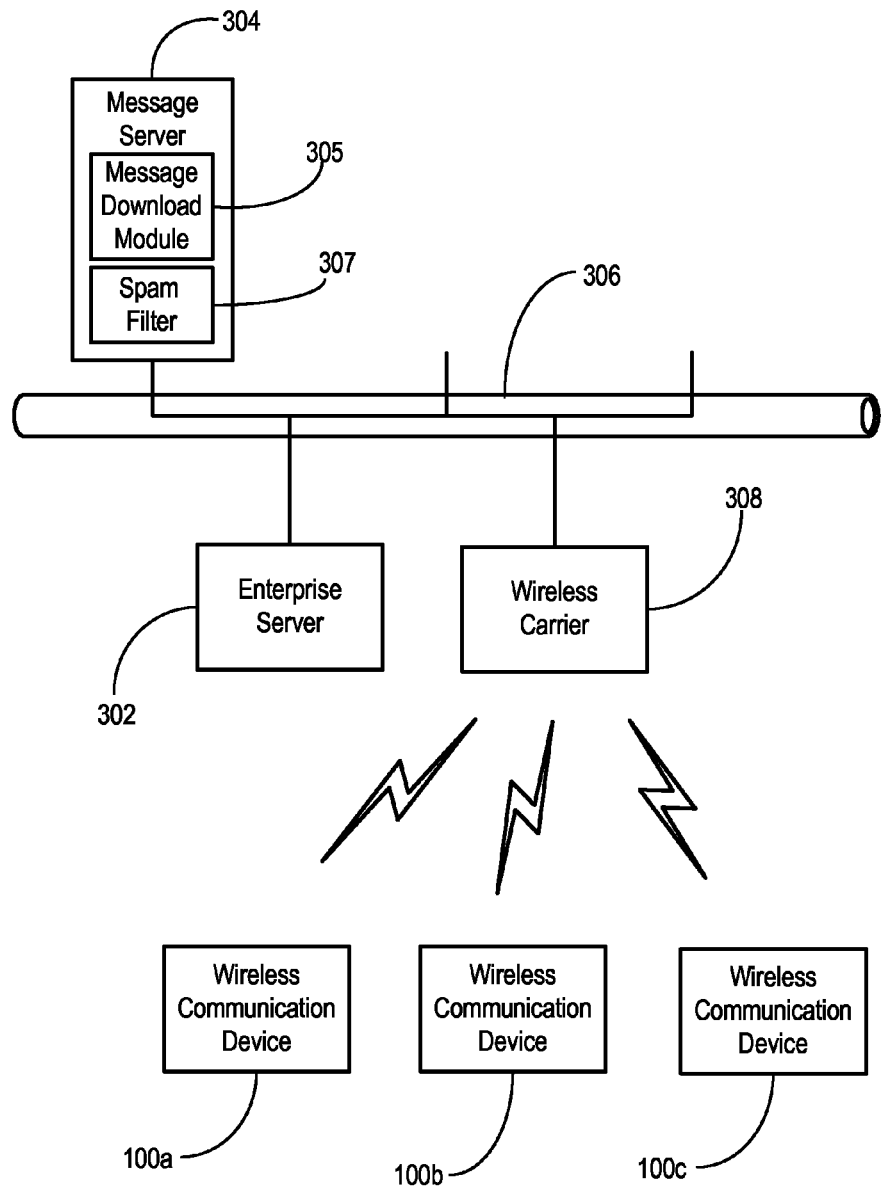
FIG. 3 is a schematic block diagram of an illustrative network which may provide a suitable operating environment.

Now referring to FIG. 3, shown is a schematic block diagram of an illustrative network 300 that may provide a suitable operating environment. As shown, network 300 includes an enterprise server 302 that may be configured to manage various communications applications including an email messaging application for users of wireless communication devices 100a to 100c. Enterprise server 302 may be connected via a local area network (LAN) or wide area network (WAN) 306 to a wireless carrier 308 configured to wirelessly transmit data to and receive data from a plurality of wireless communication devices 100a, 100b, 100c operated by various users. Enterprise server 302 may also be connected to a message server 304 configured to manage all inbound and outbound messages as seen by users on their communication devices 100a-100c.

In an embodiment, as an illustrative example, message server 304 may contain a spam filter 307 and a message download module 305 for delivering messages to the communication device 100. It will be appreciated, however, that the spam filter 307 and message download module 305 may alternatively reside on enterprise server 302, or on another external server or email store (not shown) accessible via network 306 or wireless carrier 308. Regardless of the location of the spam filter 307 and message download module 305, the function performed by each will be substantially the same, as will now be described.

In an embodiment, spam filter 307 may employ various types of filtering algorithms in order to attempt to filter out unwanted spam messages. Regardless of how intelligent a spam filtering algorithm is, it must try to maintain a reasonable balance between filtering not enough spam messages, and preventing legitimate messages from getting through. In some contexts, such as a business environment for example, it may be unacceptable if just one legitimate message from a client does not get through. Therefore, the spam filter 307 may be configured to err on the side of caution and to allow messages that may be suspected of being spam to pass through for verification by the user.

However, if a certain confidence threshold is crossed, then a message may be forwarded by message download module 305 to the communication device 100 to be verified in the same manner, regardless of the confidence level of the suspected spam message. This leaves the user of communication device 100 without the ability to distinguish between suspected spam messages without first opening them.

To address this problem, the inventors propose to communicate the probability of spam for messages that have been downloaded to a device 100 such that this information is readily discernable. In an embodiment, this may be done by displaying in a message list (i.e. a message inbox, or a combination inbox/outbox) a visual representation of the probability that a listed message appearing in the message list is spam. Based on this visual representation in a message list, as displayed on display 110, it will be easier to discern which of the listed messages is identified as being spam, and which messages are deemed more or less likely to be spam. This will now be explained in more detail in various illustrative examples as described below.

Figure 4A:
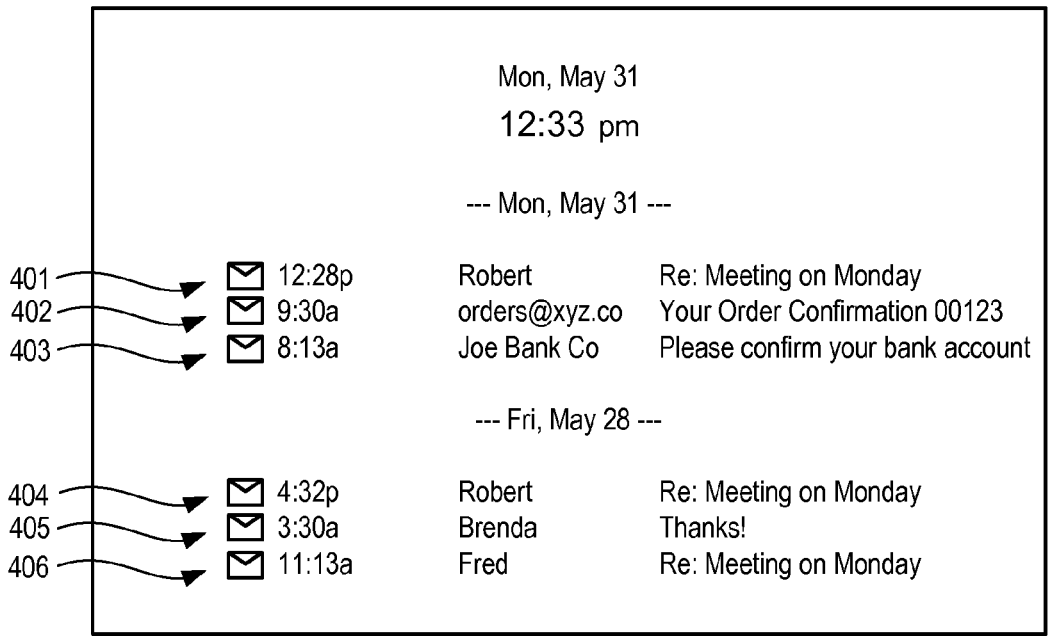

Now referring to FIG. 4A, shown is an illustrative example of a message list 400A displaying a list of messages 401-406 in a conventional manner, with an email icon, time stamp, sender and/or recipient (depending on whether the message list is an inbox, outbox, or combines both), and the subject line for the message.

Figure 4B:
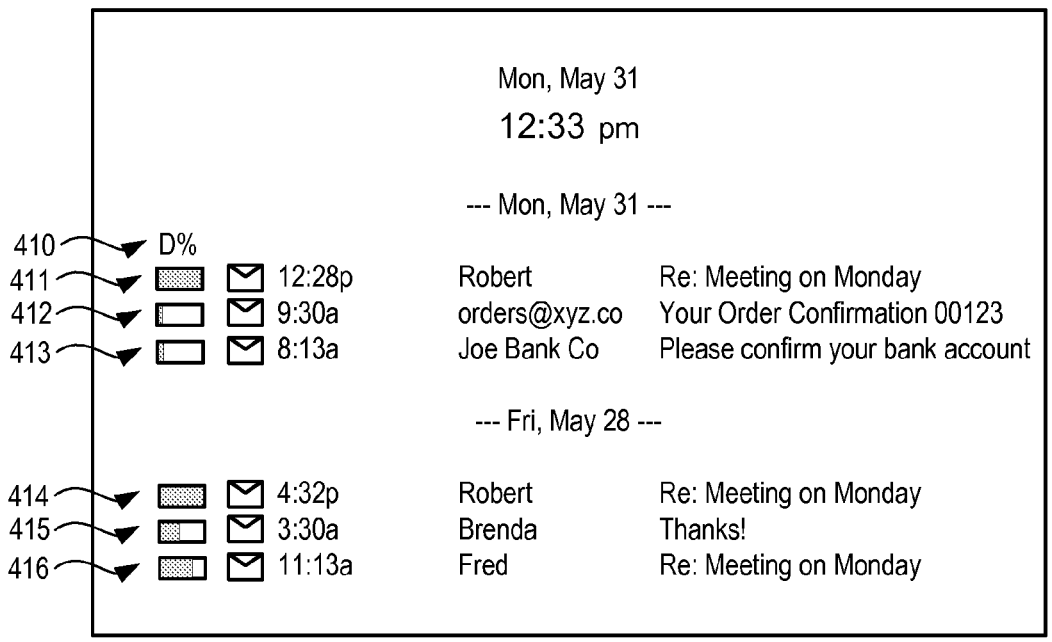

Now referring to FIG. 4B, and also referring back to FIG. 4A, shown is an illustrative example of a message list 400B in accordance with an embodiment, in which a new column of bars 411-416 appear adjacent to the list of messages 401-406. The new column of bars 411-416 may include a name 410, which in this illustrative example is simply "D %" standing for downloaded percentage—or the percentage of the message that has been downloaded to device 100 from an enterprise message server capable of managing messages sent to the device 100 using partial downloads. (It will be appreciated however, that in the case of IMAP or POP3 client based messages, such partial message downloads may not be possible).

As shown, the percentage downloaded may be visually represented by the amount of each bar that is shaded, in this case from left to right. For example, bar 411 shows that 100% of message 401 has been downloaded. Bar 412 shows that a relatively small percentage of message 402 has been downloaded and that most of the messages remains on message server 304. Bars 413-416 show various levels of shading, visually representing the percentage of each message 403-406 that has been downloaded to device 100.

It will be appreciated that, in an alternative embodiment, the bars 411-416 may instead show shading from right to left, and that rather than showing the percentage downloaded to device 100. As well, instead of showing the percentage of each message downloaded to device 100, they may instead show the percentage of each message remaining on the message server 304. Also, rather than having a shaded bar 411-416, the width or height of the bar itself may represent the percentage downloaded to device 100, or the probability that the message is spam.

Figure 4C:
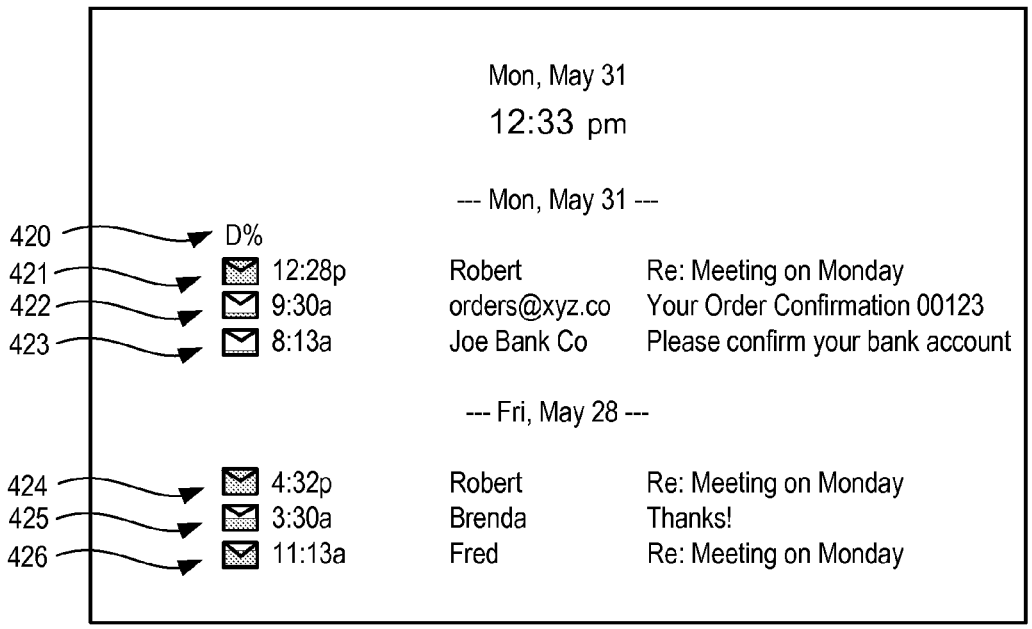

Now referring to FIG. 4C, and also referring back to FIGS. 4A and 4B, shown is an illustrative example of a message list 400C in accordance with another embodiment. In this example, rather than having bars 411-416 adjacent each message 401-406, the email icons 421-426 in each message are shaded according to the percentage of each message 401-406 that has been downloaded to device 100. In this illustrative example, the shading of each email icon 421-426 starting from bottom to top visually represents the percentage of each message 401-406 that has been downloaded. For example, email icon 423 shows that a relatively small percentage of message 403 has been downloaded. However, email icon 424 shows that 100% of message 404 has been downloaded. Optionally, a column name "D %" as shown at 420 may appear above the column of email icons 421-426 to indicate that the shading represents the download percentage.

Again, it will be appreciated that instead of showing a percentage of the message downloaded, the shading may instead represent the percentage of the email yet to be downloaded from the message server 304, and the shading of each email icon 421-426 may start fully shaded from the top and progress down to the bottom until clear. In another embodiment, rather than shading a portion of each email icon 421-426, the icon itself may be used to represent the percentage of the message downloaded (e.g. by showing half of an email icon, this may indicate that about 50% of the message has been downloaded.

Figure 4D:
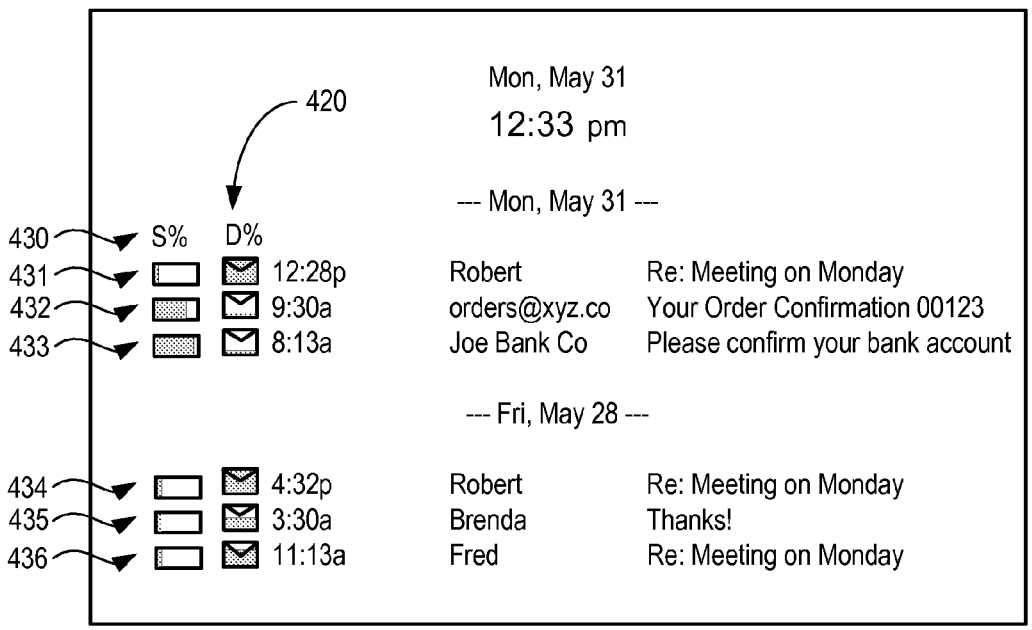

Now referring to FIG. 4D, and also referring back to FIGS. 4A to 4C, shown is an illustrative example of a message list 400D in accordance with another embodiment in which a message server is capable of partial message downloads as well as calculation of a probability that a message is spam. In this case, as shown in FIG. 4D, added is another column with the name "S %" as shown at 430, under which appear horizontal bars 431-436 adjacent each message 401-406. The column "D %" shown at 420 remains. In this case, each message 401-406 has a visual representation of both the downloaded percentage "D %" as well as the probability of spam "S %", as calculated by spam filter 307. There may or may not be some correlation between S % and D %. Thus, the visual representations of a probability that a message is spam, and the percentage of message downloaded, may be read independently or together.

Figure 4E:
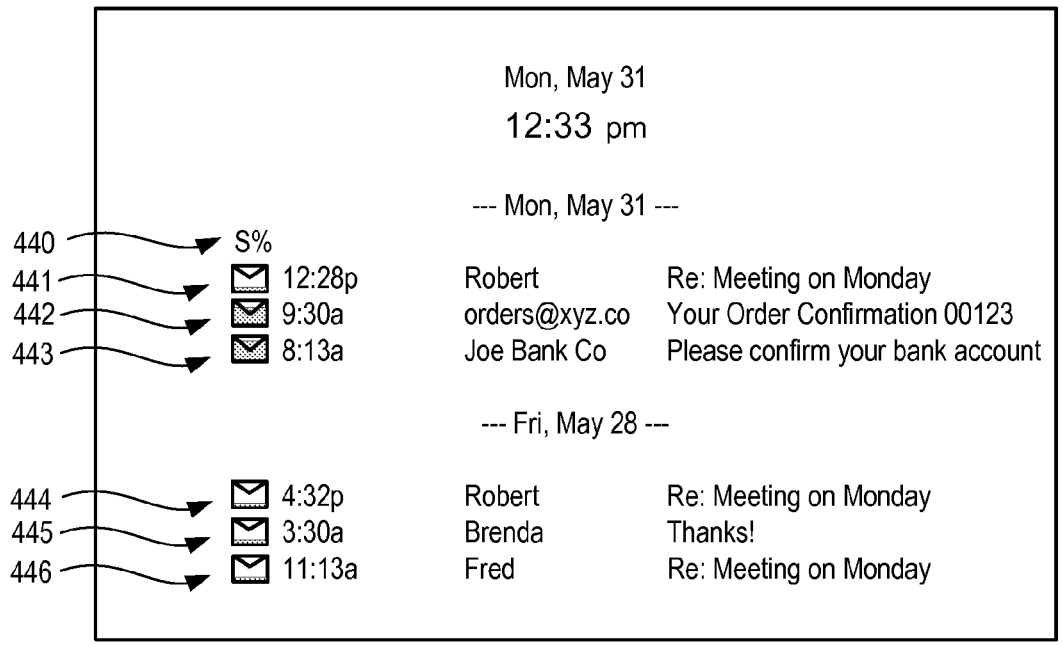

Now referring to FIG. 4E, and also referring back to FIGS. 4A to 4D, shown is an illustrative example of a message list 400E in accordance with another embodiment in which only the probability that a message is spam is visually represented. As shown in FIG. 4E, shading of email icons 441-446 are now used to represent the probability that the messages are spam "S %", as indicated by the column name 440. Contrast this to FIG. 4C, where the email icons 421-426 were used to represent the percentage of the message "D %" downloaded to the device 100. Thus, shading of the email icons may be used to visually represent either S % or D %, based on selection or preference.

Figure 4F:
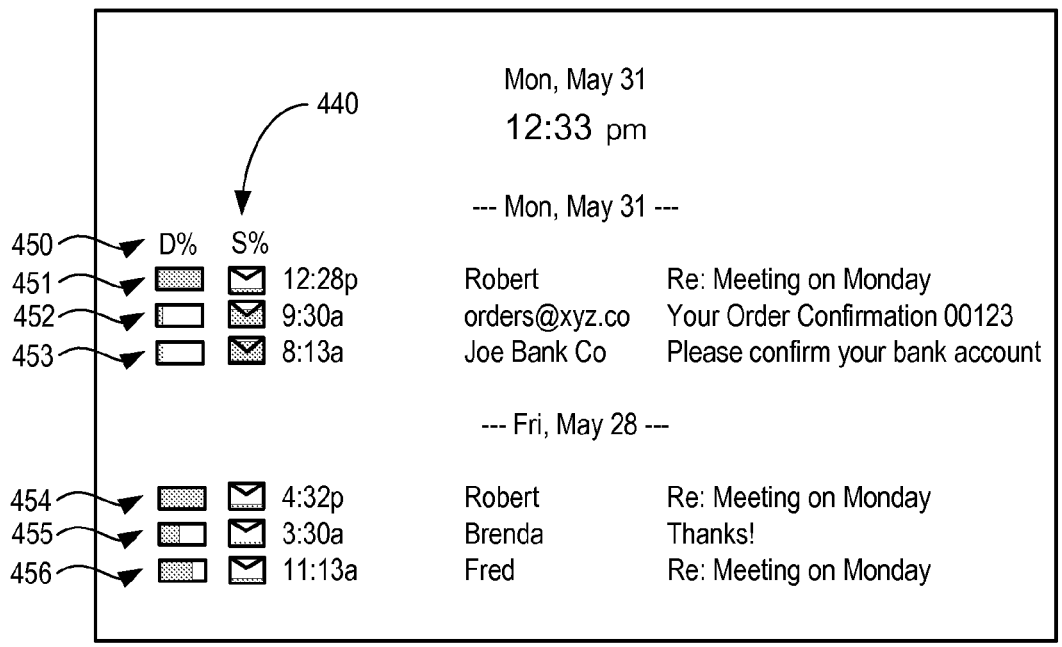

Now referring to FIG. 4F, and also referring back to FIGS. 4A to 4E, shown is an illustrative example of a message list 400F in accordance with another embodiment in which both the percentage of message downloaded and the probability that a message is spam are visually represented. As shown in FIG. 4F, new column 450 named "D %" has been added, with horizontal bars 451-456 indicating the percentage of each message 410-406 downloaded to the communication device 100. In this illustrative example, the shading of each horizontal bar from left to right visually represents the percentage of the message that has been downloaded.

Now referring to FIG. 4G, and also referring back to FIGS. 4A to 4F, shown is an illustrative example of a message list 400G in accordance with another embodiment in which both the percentage of message downloaded and the probability that a message is spam are visually represented numerically. In this illustrative example, rather than visually representing D % and S % as shading in a bar or in an icon, numeric values for each of D % and S % may be displayed for each message 401-406, as shown at 461-466. The column of values shown at 461-466 may be suitably labelled as "D %/S %", as shown at 460. These column values communicate the value of D % and S % directly, allowing messages with a higher probability of being spam to be readily discernable, as well as the percentage of the message that has been downloaded to the communication device 100.

Now referring to FIG. 4H, shown is an illustrative example of a message list 400H in which only those messages most suspected of spam may be listed, based on the probability of spam "S %", as calculated by spam filter 307. For example, message list 400H may be configured to only list messages in which S % is greater than 50. That is, spam filter 307 has calculated the probability that a message is spam at 51% or higher. In this illustrative example, only two messages have S % values greater than 50, and are listed as shown. This allows messages with the highest probability of being spam to be dealt with separately. In an embodiment, the messages appearing in message list 400H may be ordered by their S % or D % values, either in ascending order from top to bottom as shown, or alternatively in descending order from top to bottom (not shown). This ordering further allows the messages to be dealt with based on their likelihood of being spam, or based on the percentage of the message that has been downloaded.

Figure 5:
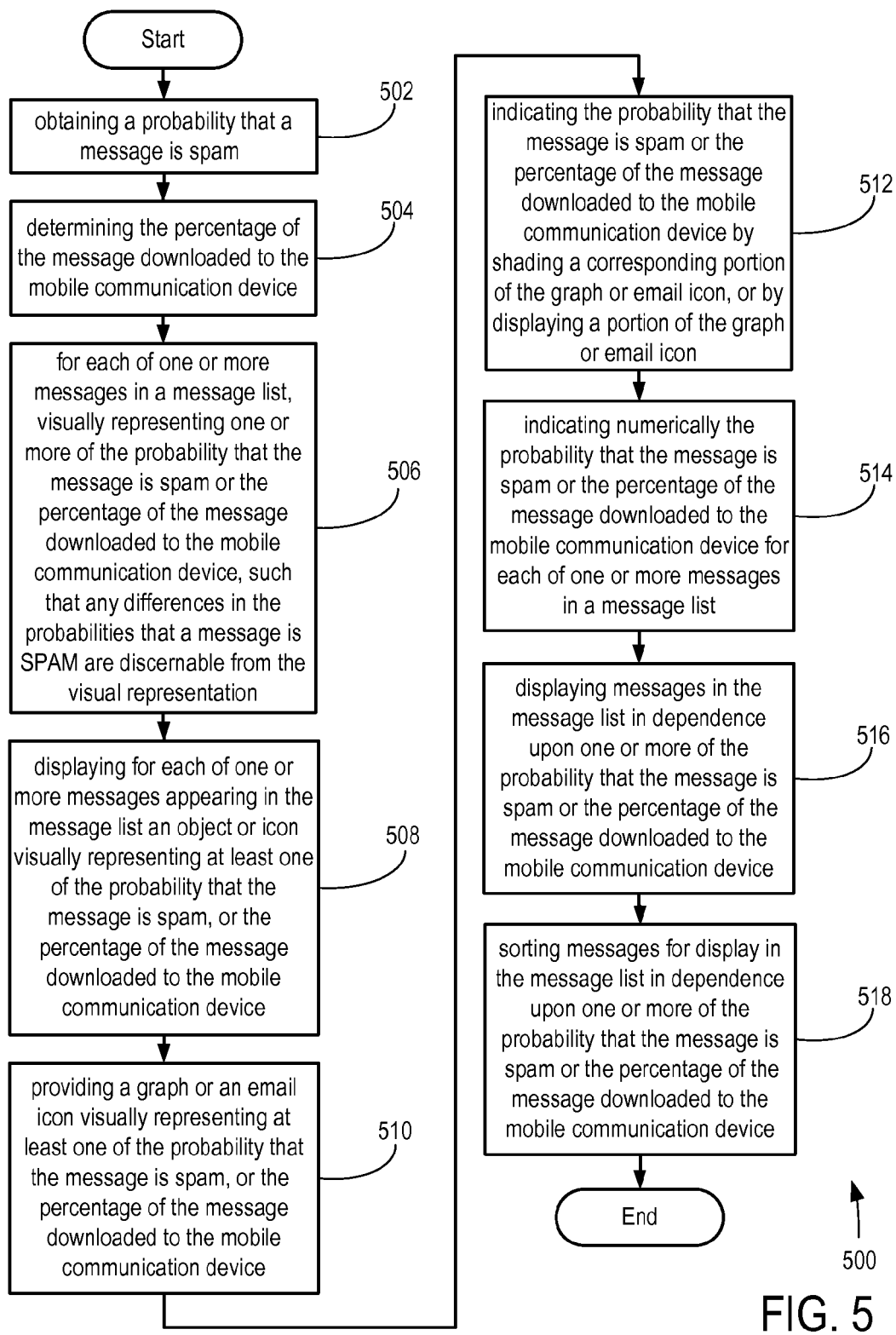
FIG. 5 is a schematic flowchart of a method in accordance with an embodiment.

Now referring to FIG. 5, shown is a schematic flowchart of an illustrative method 500 in accordance with an embodiment. As shown, method 500 begins and at block 502 method 500 obtains a probability that a message is spam.

Next, method 500 proceeds to block 504, where method 500 determines the percentage of the message downloaded to the mobile communication device.

Next, method 500 proceeds to block 506, where for each of one or more messages in a message list, method 500 visually represents one or more of the probability that the message is spam or the percentage of the message downloaded to the mobile communication device, such that any differences in the probabilities that a message is spam are discernible from the visual representation.

Next, method 500 proceeds to block 508, where method 500 displays for each of one or more messages appearing in the message list an object or icon visually representing at least one of the probability that the message is spam, or the percentage of the message downloaded to the mobile communication device.

Next, method 500 proceeds to block 510, where method 500 provides a graph or an email icon visually representing at least one of the probability that the message is spam, or the percentage of the message downloaded to the mobile communication device.

Method 500 then proceeds to block 512, where method 500 indicates the probability that the message is spam or the percentage of the message downloaded to the mobile communication device by shading a corresponding portion of the graph or email icon, or by displaying a portion of the graph or email icon.

Next, method 500 proceeds to block 514, where method 500 indicates numerically the probability that the message is spam or the percentage of the message downloaded to the mobile communication device for each of one or more messages in a message list.

Next, method 500 proceeds to block 516, where method 500 displays messages in the message list in dependence upon one or more of the probability that the message is spam or the percentage of the message downloaded to the mobile communication device.

Method 500 then proceeds to block 518, where method 500 sorts messages for display in the message list in dependence upon one or more of the probability that the message is spam or the percentage of the message downloaded to the mobile communication device. Method 500 then ends.

The techniques shown in FIG. 5, and as described generally in this disclosure, may be embodied as instructions carried by a data processor readable medium such as magnetic or optical tape or disk or read-only memory. The medium may include instructions that cause a processor on a device, such as processor 102 in FIG. 1, to carry out the techniques shown in FIG. 5.

As will be appreciated, by visually representing the probability that a message is spam, with or without related information relating to the percentage of the message that has been downloaded to the device, a significant amount of time may be saved by allowing a user if the device review spam messages most likely (or least likely if that's the user's preference) to be spam.

Thus, in an aspect, there is provided a method for visually representing the probability of spam messages on a mobile communication device, comprising: obtaining a probability that a message is spam; and for each of one or more messages in a message list, visually representing the probability that a message is spam such that any differences in the probabilities as between messages are discernable from the visual representation.

In an embodiment, the method further comprises: determining the percentage of the message downloaded to the mobile communication device; and displaying for each of one or more messages appearing in the message list an object or icon visually representing at least one of the probability that the message is spam, or the percentage of the message downloaded to the mobile communication device.

In another embodiment, the method further comprises providing a graph or an email icon visually representing at least one of the probability that the message is spam, or the percentage of the message downloaded to the mobile communication device.

In another embodiment, the method further comprises indicating the probability that the message is spam or the percentage of the message downloaded to the mobile communication device by shading a corresponding portion of the graph or email icon, or by displaying a portion of the graph or email icon.

In another embodiment, the method further comprises indicating numerically the probability that the message is spam or the percentage of the message downloaded to the mobile communication device for each of one or more messages in a message list.

In another embodiment, the method further comprises displaying messages in the message list in dependence upon one or more of the probability that the message is spam or the percentage of the message downloaded to the mobile communication device.

In another embodiment, the method further comprises sorting messages for display in the message list in dependence upon one or more of the probability that the message is spam or the percentage of the message downloaded to the mobile communication device.

In another aspect, there is provided a mobile communication device adapted to visually represent the probability of spam messages received on the device, the device having a processor and a memory and being adapted to: obtain a probability that a message is spam; and for each of one or more messages in a message list, visually represent the probability that a message is spam such that any differences in the probabilities as between messages are discernable from the visual representation.

In an embodiment, the device is further adapted to: determine the percentage of the message downloaded to the mobile communication device; and display for each of one or more messages appearing in the message list an object or icon visually representing at least one of the probability that the message is spam, or the percentage of the message downloaded to the mobile communication device.

In another embodiment, the device is further adapted to provide a graph or an email icon visually representing at least one of the probability that the message is spam, or the percentage of the message downloaded to the mobile communication device.

In another embodiment, the device is further adapted to indicate the probability that the message is spam or the percentage of the message downloaded to the mobile communication device by shading a corresponding portion of the graph or email icon, or by displaying a portion of the graph or email icon.

In another embodiment, the device is further adapted to indicate numerically the probability that the message is spam or the percentage of the message downloaded to the mobile communication device for each of one or more messages in a message list.

In another embodiment, the device is further adapted to display messages in the message list in dependence upon one or more of the probability that the message is spam or the percentage of the message downloaded to the mobile communication device.

In another embodiment, the device is further adapted to sort messages for display in the message list in dependence upon one or more of the probability that the message is spam or the percentage of the message downloaded to the mobile communication device.

In another aspect, there is provided a data processor medium storing data processor code that when loaded into a mobile communication device adapts the device to visually represent the probability of spam messages received on the device, the data processor medium comprising: code for obtaining a probability that a message is spam; code for visually representing, for each of one or more messages in a message list, the probability that a message is spam such that any differences in the probabilities as between messages are discernable from the visual representation.

In an embodiment, the data processor medium further comprises: code for determining the percentage of the message downloaded to the mobile communication device; and code for displaying for each of one or more messages appearing in the message list an object or icon visually representing at least one of the probability that the message is spam, or the percentage of the message downloaded to the mobile communication device.

In another embodiment, the data processor medium further comprises code for providing a graph or an email icon visually representing at least one of the probability that the message is spam, or the percentage of the message downloaded to the mobile communication device.

In another embodiment, the data processor medium further comprises code for indicating the probability that the message is spam or the percentage of the message downloaded to the mobile communication device by shading a corresponding portion of the graph or email icon, or by displaying a portion of the graph or email icon.

In another embodiment, the data processor medium further comprises code for indicating numerically the probability that the message is spam or the percentage of the message downloaded to the mobile communication device for each of one or more messages in a message list.

In another embodiment, the data processor medium further comprises code for displaying messages in the message list in dependence upon one or more of the probability that the message is spam or the percentage of the message downloaded to the mobile communication device.

In another embodiment, the data processor medium further comprises code for sorting messages for display in the message list in dependence upon one or more of the probability that the message is spam or the percentage of the message downloaded to the mobile communication device.

While illustrative embodiments have been described above, it will be appreciated that various changes and modifications may be made. More generally, the scope of the invention is defined by the following claims.

We claim:

1. A method, comprising:
for each of a plurality of messages,
   obtaining a corresponding likelihood that the message is spam; and
   determining a corresponding amount of the message sent to a communication device; and
displaying a listing of the plurality of messages in which each message of the plurality of messages is listed with both an indicator of its corresponding likelihood that the message is spam and an indicator of its corresponding amount sent to the communication device.

2. The method of claim 1, further comprising the communication device initially receiving at least a portion of each of the plurality of messages.

3. The method of claim 1, wherein the corresponding likelihood that the message is spam is expressed as a probability value.

4. The method of claim 1, wherein the corresponding amount of the message sent to the communication device is expressed as a percentage value.

5. The method of claim 1, wherein the indicator of the corresponding likelihood comprises an icon.

6. The method of claim 1, wherein the indicator of the corresponding amount comprises an icon.

7. The method of claim 1, wherein the corresponding likelihood is computed at a server.

8. The method of claim 1, wherein, of the plurality of messages:
at least one of the plurality of messages is completely sent to the communication device; and
at least one of the plurality of messages is only partially sent to the communication device.

9. The method of claim 1, wherein the listing of the plurality of messages thus displayed is filtered to include only those messages having a corresponding probability over a defined value.

10. An electronic device including a processor, the processor being configured to:
for each of a plurality of messages,
   obtain a corresponding likelihood that the message is spam; and
   determine a corresponding amount of the message sent to a communication device; and
display a listing of the plurality of messages in which each message of the plurality of messages is listed with both an indicator of its corresponding likelihood that the message is spam and an indicator of its corresponding amount sent to the communication device.

11. The electronic device of claim 10, wherein the electronic device initially receives at least a portion of each of the plurality of messages.

12. The electronic device of claim 10, wherein the corresponding likelihood that the message is spam is expressed as a probability value.

13. The electronic device of claim 10, wherein the corresponding amount of the message sent to the communication device is expressed as a percentage value.

14. The electronic device of claim 10, wherein the indicator of the corresponding likelihood comprises an icon.

15. The electronic device of claim 10, wherein the indicator of the corresponding amount comprises an icon.

16. The electronic device of claim 10, wherein the corresponding likelihood is computed at a server.

17. The electronic device of claim 10, wherein, of the plurality of messages:
at least one of the plurality of messages is completely sent to the communication device; and
at least one of the plurality of messages is only partially sent to the communication device.

18. The electronic device of claim 10, wherein the listing of the plurality of messages thus displayed is filtered to include only those messages having a corresponding probability over a defined value.

19. The electronic device of claim 10, wherein the electronic device is the communication device.

20. A non-transitory electronic device-readable medium bearing code which, when executed by a processor of an electronic device, causes the electronic device to:
for each of a plurality of messages,
   obtain a corresponding likelihood that the message is spam; and
   determine a corresponding amount of the message sent to a communication device; and
display a listing of the plurality of messages in which each message of the plurality of messages is listed with both an indicator of its corresponding likelihood that the message is spam and an indicator of its corresponding amount sent to the communication device.

* * * * *